(12) United States Patent
Chen (10) Patent No.: US 11,397,581 B2
(45) Date of Patent: Jul. 26, 2022

(54) DATA TRANSMISSION SYSTEM CAPABLE OF PERFORM UNION TASK WITH A PLURALITY OF CHANNEL CONTROL MODULES

(71) Applicant: Realtek Semiconductor Corp., HsinChu (TW)

(72) Inventor: Yuefeng Chen, Suzhou (CN)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/185,842

(22) Filed: Feb. 25, 2021

(65) Prior Publication Data

US 2021/0279056 A1 Sep. 9, 2021

(30) Foreign Application Priority Data

Mar. 3, 2020 (CN) .......................... 202010139205.3

(51) Int. Cl.
*G06F 3/06* (2006.01)
*G06F 9/50* (2006.01)
*G06F 9/30* (2018.01)
*G06F 13/16* (2006.01)

(52) U.S. Cl.
CPC ........ *G06F 9/3004* (2013.01); *G06F 9/30101* (2013.01); *G06F 9/30189* (2013.01); *G06F 13/1621* (2013.01); *G06F 13/1668* (2013.01)

(58) Field of Classification Search
None
See application file for complete search history.

(56) References Cited

U.S. PATENT DOCUMENTS

| 5,388,237 | A | 2/1995 | Sodos | |
| 6,018,778 | A * | 1/2000 | Stolowitz | G06F 3/061 |
| | | | | 710/52 |
| 8,176,252 | B1 | 5/2012 | Alexander | |
| 8,234,479 | B2 | 7/2012 | Jeddeloh | |
| 9,971,524 | B1 | 5/2018 | Bruce | |
| 10,216,645 | B2 | 2/2019 | Bowler | |
| 11,106,607 | B1 * | 8/2021 | Kotzur | G06F 13/4027 |
| 2008/0250077 | A1 * | 10/2008 | Fahey | H04L 67/1097 |
| 2008/0270689 | A1 * | 10/2008 | Gotoh | G06F 12/084 |
| | | | | 711/E12.027 |
| 2009/0037679 | A1 * | 2/2009 | Kaushik | G06F 3/067 |
| | | | | 711/162 |

(Continued)

FOREIGN PATENT DOCUMENTS

CN 100580639 C 1/2010

*Primary Examiner* — Hyun Nam
(74) *Attorney, Agent, or Firm* — Winston Hsu (57) ABSTRACT

A data transmission system includes a first memory, a second memory, a third memory; and a memory controller. The memory controller includes a first channel control module and a second channel control module. The first channel control module is coupled to the first memory and the second memory. The first channel control module transmits a first set of data between the first memory and the second memory, and transmits a switch signal after the first set of data is transmitted. The second channel control module is coupled to the first channel control module, the first memory, and the third memory. The second channel control module transmits a second set of data between the first memory and the third memory after receiving the switch signal.

20 Claims, 6 Drawing Sheets (56) References Cited

U.S. PATENT DOCUMENTS

| | | | |
|---|---|---|---|
| 2009/0080562 A1* | 3/2009 | Franson | H04L 27/02 375/268 |
| 2013/0185510 A1* | 7/2013 | Ash | G06F 12/0802 711/118 |
| 2019/0222649 A1* | 7/2019 | Cheng | G06F 15/17331 |

* cited by examiner

DATA TRANSMISSION SYSTEM CAPABLE OF PERFORM UNION TASK WITH A PLURALITY OF CHANNEL CONTROL MODULES

BACKGROUND OF THE INVENTION

1. Field of the Invention

The present invention is related to a data transmission system, and more particularly to a data transmission system capable of perform union task with a plurality of channel control modules.

2. Description of the Prior Art

In an electronic system, a direct memory access (DMA) controller is often used to assist the central processing unit (CPU) to transmit data between memories so that the CPU can have more time processing the required computations, instead of being occupied by tremendous transmission tasks. The DMA controller can transmit data between different memories through the channel control modules. For example, the DMA controller can assign the source address and the target address of a data transmission task, and the channel control module will transmit the data stored in the source address to the target address accordingly.

In prior art, the channel control module can independently perform a scatter operation or a gather operation to transmit a single memory block of data. That is, the channel control module can move the data obtained from different source addresses to a memory block, and the data can be stored to continuous addresses in the memory block. Also, the channel control module can use a link list to perform the transmission among multiple memory blocks. For example, the channel control module can obtain the source address and the target address of a first memory block according to a first node in the link list, and can further obtain the second node according to the pointer stored in the first node after the first memory block has been transmitted. Thus, the channel control module can complete the transmission of the second memory block according to the second node, and so on. However, if the amount of transmission data is rather large or the requirement of data transmission is rather complicated, then the system will need to store lots of nodes in the link list. In addition, if the data transmission needs to involve multiple different memories, then the handshaking processes with different memories will be performed repeatedly, thereby lowering the efficiency of data transmission.

SUMMARY OF THE INVENTION

One embodiment of the present invention discloses a data transmission system. The data transmission system includes a first memory, a second memory, a third memory, and a memory controller.

The memory controller includes a first channel control module and a second channel control module. The first channel control module is coupled to the first memory and the second memory. The first channel control module transmits a first set of data between the first memory and the second memory, and transmits a switch signal after the first set of data is transmitted. The second channel control module is coupled to the first channel control module, the first memory, and the third memory. The second channel control module transmits a second set of data between the first memory and the third memory after receiving the switch signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
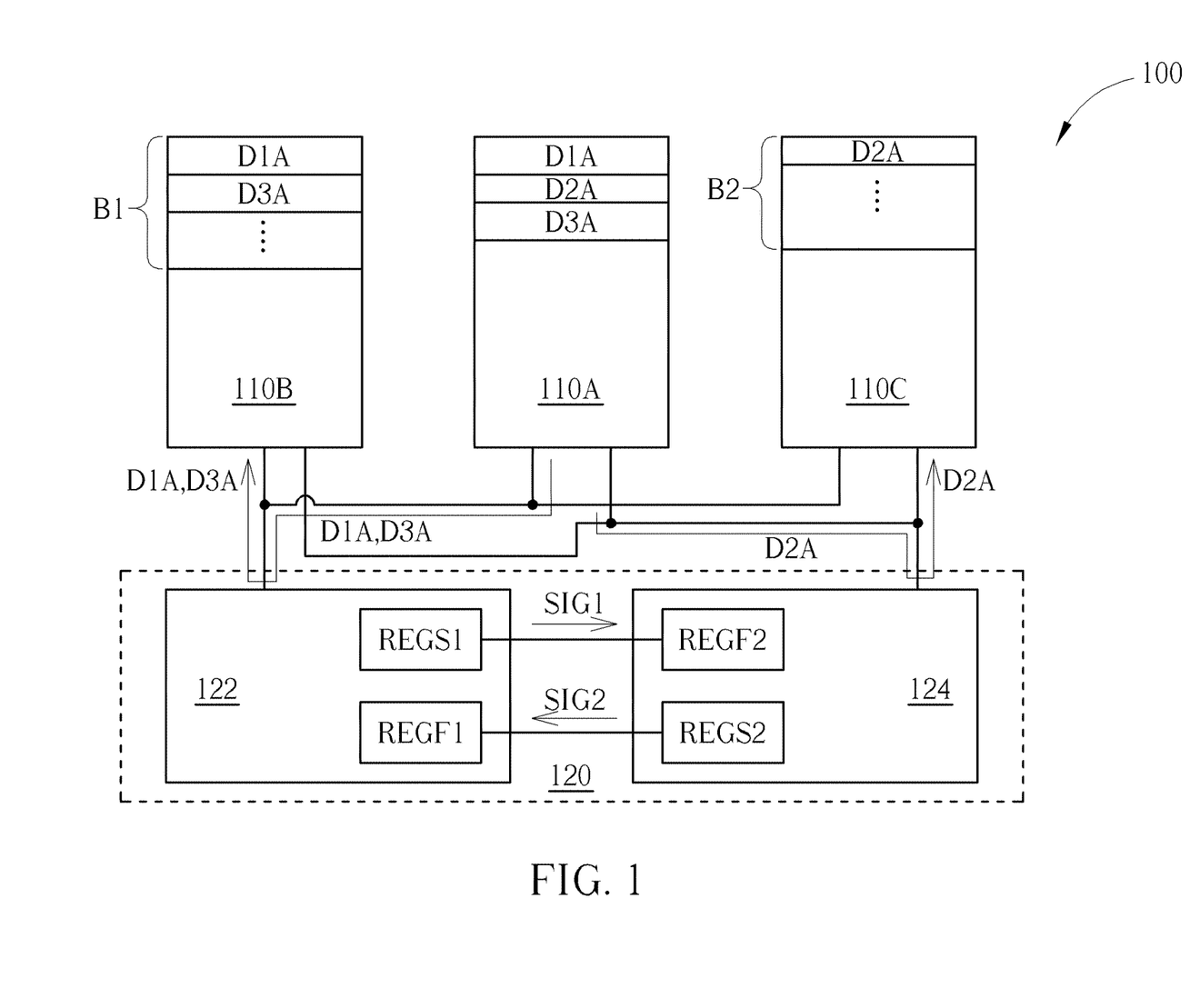
FIG. 1 shows a data transmission system according to one embodiment of the present invention.

FIG. 1 shows a data transmission system 100 according to one embodiment of the present invention. The data transmission system 100 includes a first memory 110A, a second memory 110B, a third memory 110C, and a memory controller 120. The memory controller 120 can be the direct memory access (DMA) controller of the system, and can include a first channel control module 122 and a second channel control module 124.

In some embodiments, the first channel control module 122 can be coupled to the first memory 110A, the second memory 110B, and the third memory 110C, and can access the data stored in the first memory 110A, the second memory 110B, and the third memory 110C. Similarly, the second channel control module 124 can be coupled to the first memory 110A, the second memory 110B, and the third memory 110C, and can access the data stored in the first memory 110A, the second memory 110B, and the third memory 110C.

Furthermore, the first channel control module 122 can be coupled to the second channel control module 124 so that the first channel control module 122 and the second channel control module 124 can communicate with each other to share the transmission status and cooperate to perform union tasks.

For example, the first channel control module 122 can transmit a first set of data D1A between the first memory 110A and the second memory 110B, and transmit a first switch signal SIG1 to the second channel control module 124 after the first set of data D1A is transmitted. After the second channel control module 124 receives the first switch signal SIG1, the second channel control module 124 can transmit a second set of data D2A between the first memory 110A and the third memory 110C. In FIG. 1, when the second channel control module 124 completes the transmission of the second set of data D2A, the second channel control module 124 can further transmit a second switch signal SIG2 to the first channel control module 122. In this case, when the first channel control module 122 receives the second switch signal SIG2, the first channel control module 122 can transmit a third set of data D3A between the first memory 110A and the second memory 110B. Consequently, the first channel control module 122 and the second channel control module 124 can transmit data between the first memory 110A and the second memory 110B and between the first memory 110A and the third memory 110C in turns.

For example, in FIG. 1, the first channel control module 122 can transmit the first set of data D1A from the first memory 110A to the second memory 110B, and then, the second channel control module 124 can transmit the second set of data D2A from the first memory 110A to the third memory 110C after receiving the first switch signal SIG1. Also, when the first channel control module 122 receives the second switch signal SIG2, the first channel control module 122 would transmit the third set of data D3A from the first memory 110A to the second memory 110B.

In addition, in FIG. 1, the first set of data D1A and the third set of data D3A can be stored in the block B1 in the second memory 110B. That is, in FIG. 1, the data transmission system 100 can perform the scatter operation to transmit the data in the block B1 with the first channel control module 122. Similarly, the data transmission system 100 can perform the scatter operation to transmit the data in the block B2 with the second channel control module 124.

In this case, every time when the first channel control module 122 completes the transmission of a set of data between the first memory 110A and the second memory 110B, the first channel control module 122 will perform a hardware handshaking with the first memory 110A and/or the second memory 110B. Therefore, in some embodiments, the first channel control module 122 can determine that the first set of data D1A has been transmitted after the hardware handshaking is finished, and can correspondingly transmit the first switch signal SIG1 to the second channel control module 124, so the transmission of the second set of data D2A can proceed.

Furthermore, since the first channel control module 122 and the second channel control module 124 can be operated independently, the data length of the first set of data D1A and the data length of the second set of data D2A can be different in some embodiments. For example, in FIG. 1, the first set of data D1A can include four pieces of data stored in addresses 0x0000 to 0x0003 in the first memory 110A, the second set of data D2A can include two pieces of data stored in addresses 0x0004 to 0x0005 in the first memory 110A, and the third set of data D3A can include another four pieces of data stored in addresses 0x0006 to 0x0009 in the first memory 110A. That is, the first channel control module 122 and the second channel control module 124 can perform the scatter operations with different parameters, and the first channel control module 122 and the second channel control module 124 can perform operations independently and alternatively.

In addition, in some embodiments, in the second memory 110B, the first set of data D1A, the third set of data D3A, and the data to be retrieved successively can be stored in continuous addresses in the first memory 110A or stored in addresses separated by a fixed address interval. Similarly, the second set of data D2A and the data to be retrieved successively can be stored in continuous addresses in the second memory 110B or stored in addresses separated by a fixed address interval.

In FIG. 1, the first channel control module 122 can include a first start flag register REGS1 and a first finish flag register REGF1, and the second channel control module 124 can include a second start flag register REGS2 and a second finish flag register REGF2. In addition, the first finish flag register REGF1 and the second start flag register REGS2 can be coupled together and can be synchronized. Also, the second finish flag register REGF2 and the first start flag register REGS1 can be coupled together and can be synchronized. In this case, when the first channel control module 122 completes the transmission of the first set of data D1A, the first channel control module 122 would update the value of the first finish flag register REGF1 so as to transmit the first switch signal SIG1 to the second channel control module 124 for updating the value of the second start flag register REGS2 correspondingly. In some embodiments, when the second channel control module 124 starts to transmit the second set of data D2A, the second channel control module 124 can further update the value of the second start flag register REGS2 so as to update the value of the first finish flag register REGF1, thereby allowing the operation to proceed. Similarly, after the second set of data D2A has been transmitted, the second channel control module 124 will update the value of the second finish flag register REGF2 so as to transmit the second switch signal SIG2 to the first channel control module 122 and update the value of the first start flag register REGS1.

In FIG. 1, the data transmission system 100 can transmit the first switch signal SIG1 and the second switch signal SIG2 by updating the flag registers; however, in some other embodiments, the data transmission system 100 can transmit the first switch signal SIG1 and the second switch signal SIG2 by handshaking.

Figure 2:
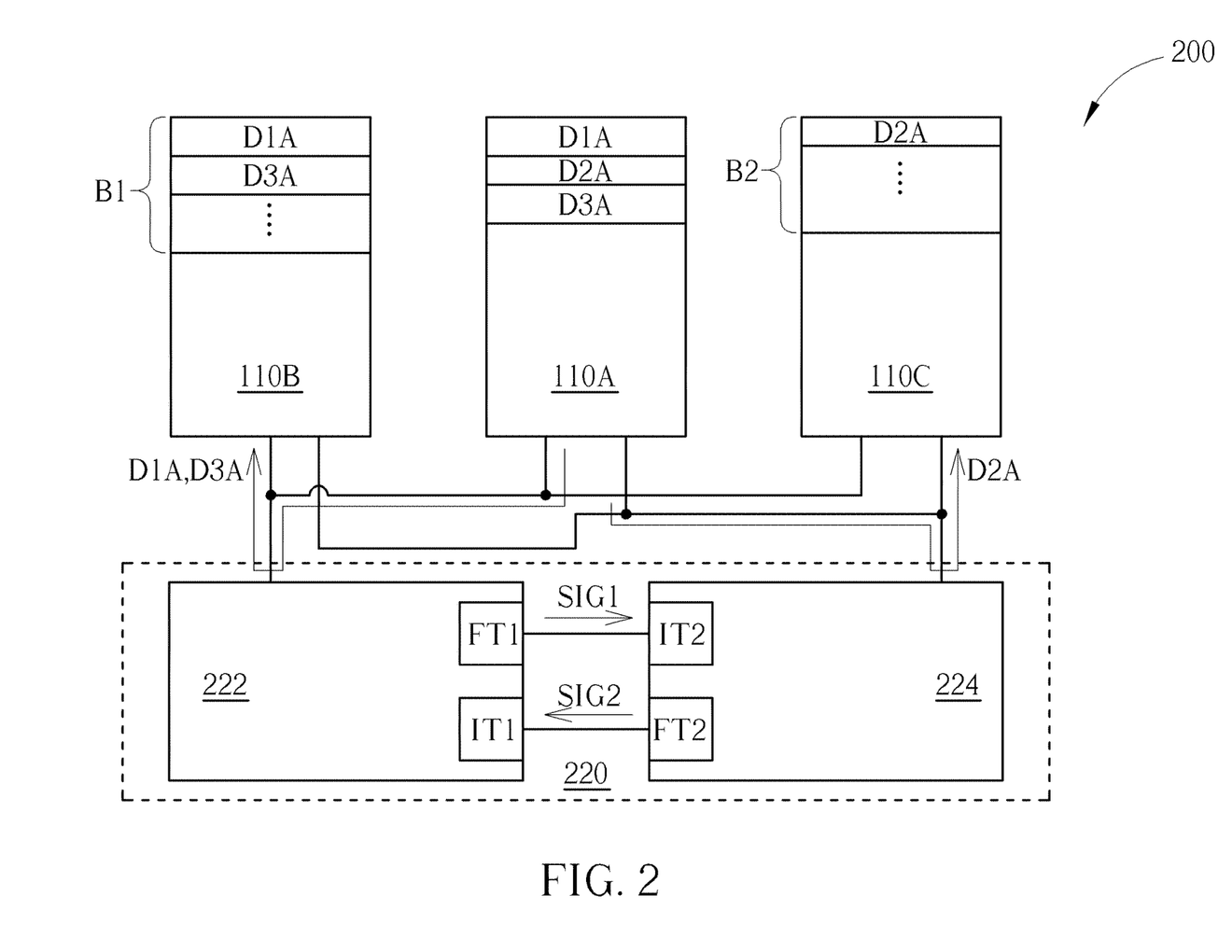
FIG. 2 shows a data transmission system according to another embodiment of the present invention.

FIG. 2 shows a data transmission system 200 according to another embodiment of the present invention. In FIG. 2, the memory controller 220 of the data transmission system 200 can include a first channel control module 222 and a second channel control module 224. The first channel control module 222 can include a first start signal terminal IT1 and a first finish signal terminal FT1, and the second channel control module 224 can include a second start signal terminal IT2 and a second finish signal terminal FT2. The first finish signal terminal FT1 and the second start signal terminal IT2 can be coupled together, and the second finish signal terminal FT2 and the first start signal terminal IT1 can be coupled together.

In some embodiments, after the first channel control module 222 finishes transmitting the first set of data D1A, the first channel control module 222 can output the first switch signal SIG1 through the first finish signal terminal FT1, so the second channel control module 224 can start to transmit the second set of data D2A. Also, after the second set of data D2A has been transmitted, the second channel control module 224 can output the second switch signal SIG2 through the second finish signal terminal FT2, so the first channel control module 222 can start to transmit the third set of data D3A.

In some embodiments, after the second channel control module 224 finishes the transmission of the second set of data D2A, the second channel control module 224 can transmit an acknowledge signal to the first channel control module 222. Therefore, the first channel control module 222 can change the voltages of the first finish signal terminal FT1 and the second start signal terminal IT2, allowing the first channel control module 222 to transmit the switch signal to the second channel control module 224 later. Similarly, after the first channel control module 222 has finished transmitting the data, the first channel control module 222 can also transmit an acknowledge signal to the second channel control module 224. Therefore, the second channel control module 224 can change the voltages of the second finish signal terminal FT2 and the first start signal terminal IT1, allowing the second channel control module 224 to transmit the switch signal to the first channel control module 222 later.

Furthermore, in some embodiments, the first switch signal SIG1 and the second switch signal SIG2 can be pulse signals. In this case, the first channel control module 222 and the second channel control module 224 may keep performing the union task without sending the acknowledge signals for handshaking.

In FIG. 1, the first channel control module 122 can transmit the first set of data D1A, the third set of data D3A, and the succeeding data to perform a scatter operation, and the second channel control module 124 can transmit the second set of data D2A and the succeeding data to perform a scatter operation. However, in some other embodiments, the first channel control module 122 and the second channel control module 124 can also transmit data to perform gather operations.

Figure 3:
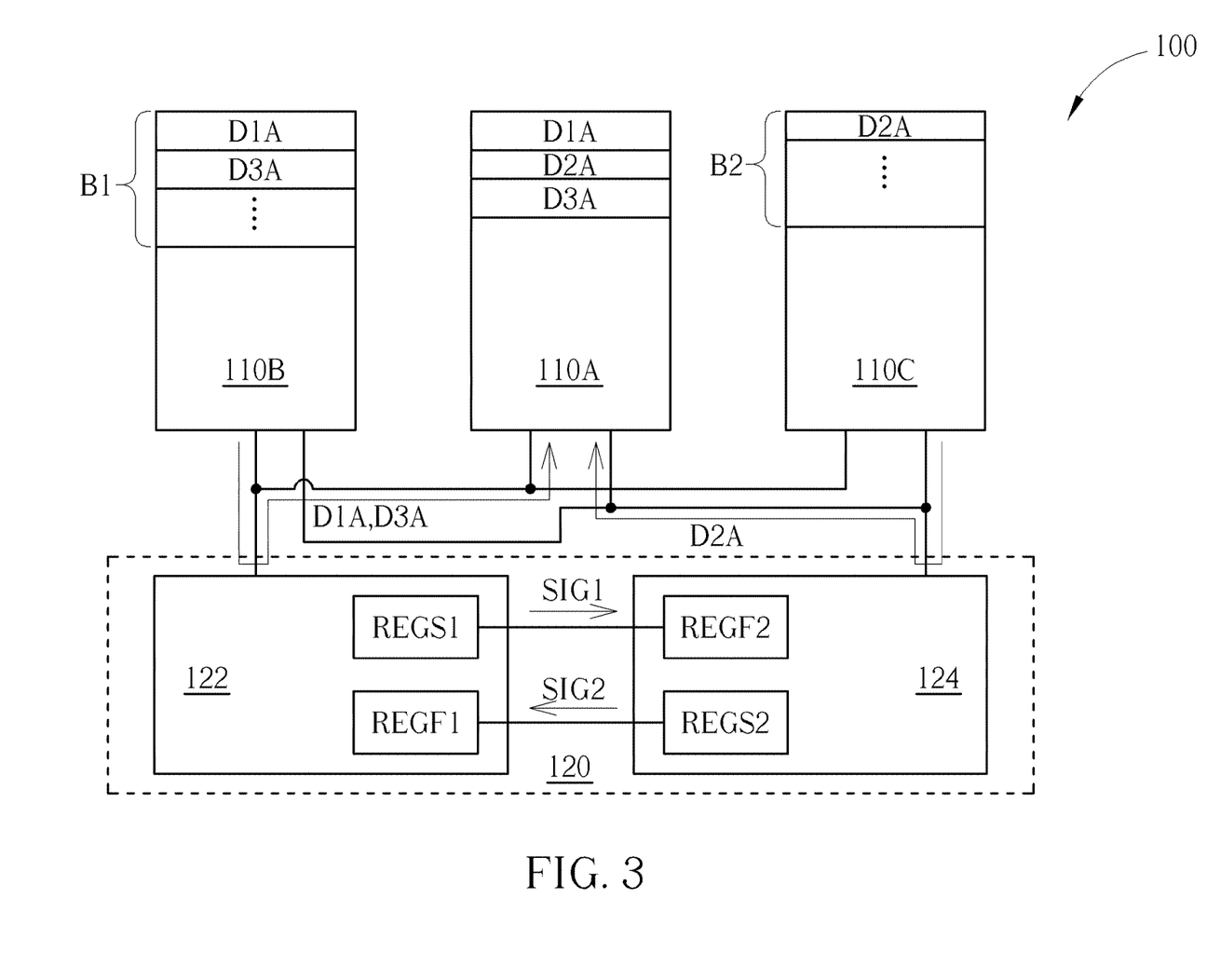
FIG. 3 shows another usage scenario of the data transmission system in FIG. 1.

FIG. 3 shows another usage scenario of the data transmission system 100. In FIG. 3, the first channel control module 122 can transmit the first set of data D1A from the second memory 110B to the first memory 110A, and the second channel control module 124 can transmit the second set of data D2A from the third memory 110C to the first memory 110A after receiving the first switch signal SIG1. Then, after receiving the second switch signal SIG2 from the second channel control module 124, the first channel control module 122 can transmit the third set of data D3A from the second memory 110B to the first memory 110.

That is, in FIG. 3, the data transmission system 100 can perform the gather operations to transmit the data in the block B1 with the first channel control module 122 and perform the gather operations to transmit the data in the block B2 with the second channel control module 124. Consequently, data dispersed in the second memory 110B and the third memory 110C can be collected and stored to the continuous addresses in the first memory 110A.

In FIGS. 1 and 3, the first channel control module 122 and the second channel control module 124 can each transmit one block of data. However, in some other embodiments, the first channel control module 122 and the second channel control module 124 can each transmit a plurality of blocks of data.

Figure 4:
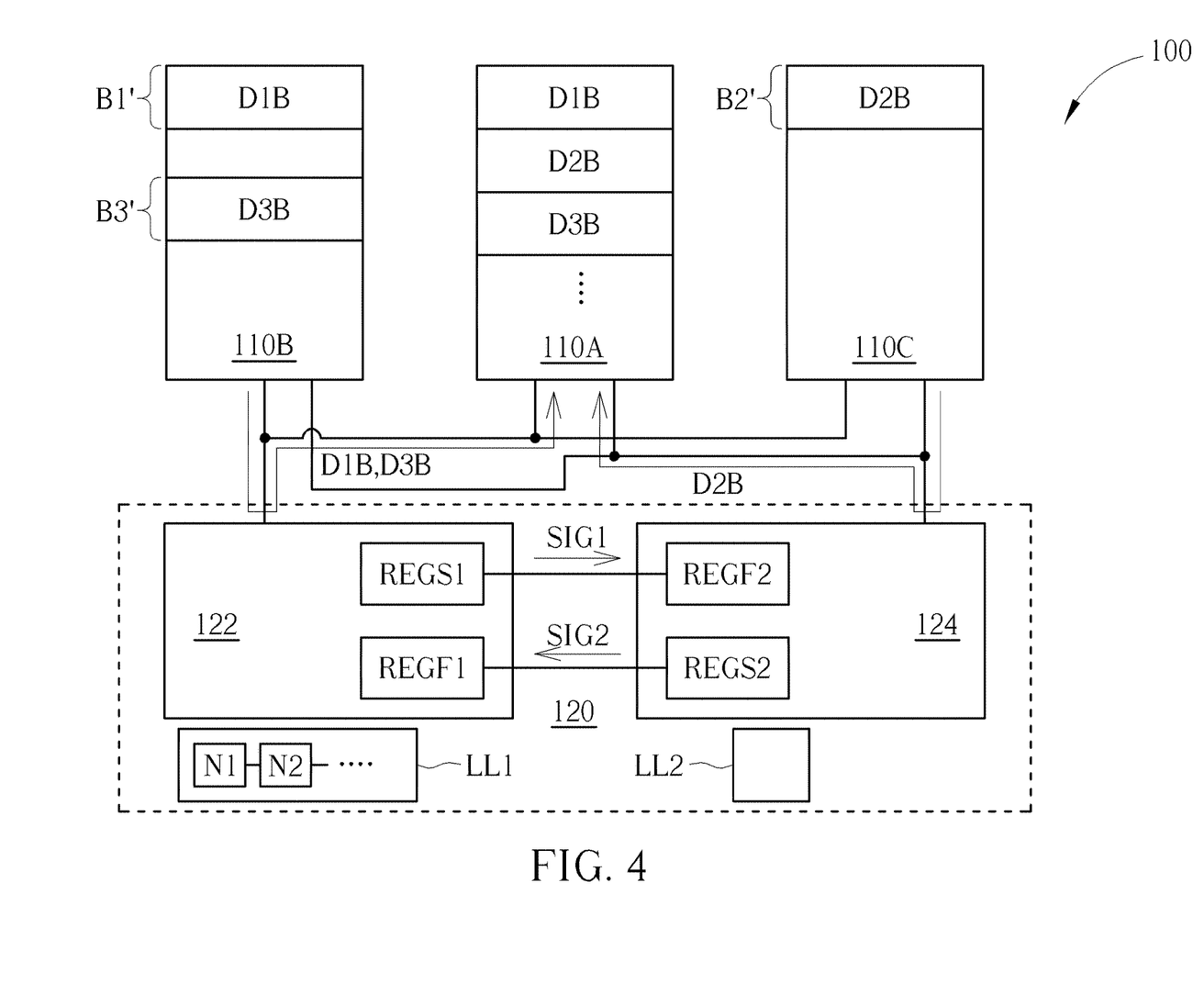
FIG. 4 shows another usage scenario of the data transmission system in FIG. 1.

FIG. 4 shows another usage scenario of the data transmission system 100. In FIG. 4, the first channel control module 122 can transmit the first switch signal SIG1 after the first channel control module 122 transmits a complete block of data. Also, the second channel control module 124 can transmit the second switch signal SIG2 after the second channel control module 124 transmits a complete block of data. That is, in FIG. 4, the first set of data D1B, the second set of data D2B, and the third set of data D3B can be respectively corresponding to the complete blocks B1', B2', and B3'.

In this case, the first channel control module 122 can use a link list to transmit a plurality of blocks of data. For example, the data transmission system 100 can store the information of different blocks in the storage nodes of the link list. That is, each of the storage nodes can include the source address and the target address of the memory block to be transmitted. Also, each of the storage nodes can store a location of the next storage node. In this case, the first channel control module 122 can obtain the transmission addresses (including the source address and the target address) corresponding to the first set of data D1B from the first storage node N1 of the link list LL1, and reach the second storage node N2 of the link list LL1 according to the first storage node N1. Later, when receiving the second switch signal SIG2, the first channel control module 122 can obtain the transmission address corresponding to the third set of data D3B from the second storage node N2. Consequently, the first channel control module 122 can obtain a plurality of blocks of data dispersed in different locations and complete the data transmission for a plurality of blocks of data. Similarly, the data transmission system 100 can also include a link list LL2 so the second channel control module 124 can obtain the locations of a plurality of blocks according to the link list LL2.

Generally, when the first channel control module 122 and the second channel control module 124 perform the data transmission for multiple blocks, a block transmission signal would be generated every time when a block of data is transmitted. In this case, the block transmission signal would notify the first channel control module 122 that the first set of data D1B has been transmitted, so the first channel control module 122 can send the first switch signal SIG1 to the second channel control module 124 accordingly. Similarly, the block transmission signal would notify the second channel control module 124 that the second set of data D2B has been transmitted, so the second channel control module 124 can send the second switch signal SIG2 to the first channel control module 122 accordingly, and so on.

In some embodiments, the data transmission system 100 can use the link list to record the addresses of a plurality of blocks, or the data transmission system 100 can use a contiguous address scheme or an auto-reload scheme to perform the data transmission for multiple blocks. For example, the third set of data D3B can be stored in the address next to the first set of data D1B in the second memory 110B. Therefore, the first channel control module 122 can increment the address and obtain the third set of data D3B in the second memory 110B after the first channel control module 122 transmits the first set of data D1B. Consequently, the data transmission system 100 can implement data transmission for multiple blocks by using the contiguous address scheme.

Or, in some embodiments, the data stored in the second memory 110B can be updated continuously, so the first channel control module 122 can obtain the first set of data D1B and the third set of data D3B from the same address in the second memory 110B at different periods of time. Consequently, the data transmission system 100 can implement data transmission for multiple blocks by using the auto-reload scheme.

Consequently, by performing the union tasks with the first channel control module 122 and the second channel control module 124, the data transmission system 100 can simplify the data transmission among different memories and improve the efficiency of transmission.

In addition, since the first channel control module 122 and the second channel control module 124 are independently operated, these two may adopt different schemes to implement data transmission for multiple blocks. For example, the first channel control module 122 can perform the data transmission for multiple blocks according to a link list while the second channel control module 124 can perform the data transmission for multiple blocks by using the contiguous address scheme or auto-reload scheme. However, in prior art, since the data transmission for multiple blocks is performed by only one channel control module, it has to be implemented by using a large link list to record all the addresses of the blocks, and cannot use the link list along with the contiguous address scheme or the auto-reload scheme at the same time. That is, by performing the union task with the first channel control module 122 and the second channel control module 124, the data transmission among different memories can be simplified, and the number of storage nodes in the link list can be reduced, thereby reducing the storage space required by the data transmission system 100 and improving the efficiency of data transmission.

Figure 5:
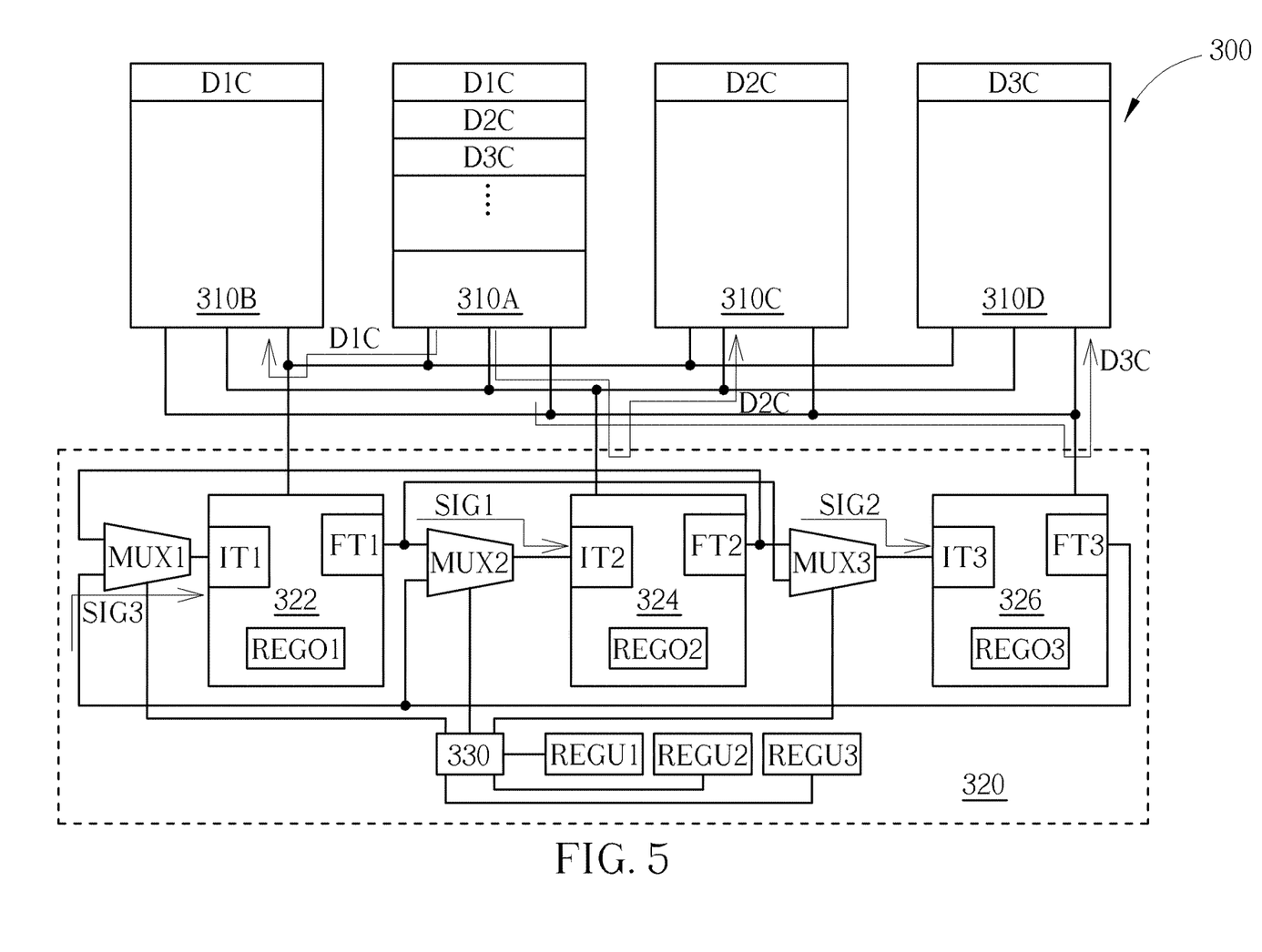
FIG. 5 shows a data transmission system according to one embodiment of the present invention.

In some embodiments, the data transmission system can further include more channel control modules to perform the union tasks so the data transmission among different memories can be even more flexible and efficient. FIG. 5 shows a data transmission system 300 according to one embodiment of the present invention. The data transmission system 300 can include a first memory 310A, a second memory 310B, a third memory 310C, a fourth memory 310D, and a memory controller 320. The memory controller 320 can include a first channel control module 322, a second channel control module 324, and a third channel control module 326. The third channel control module 326 can be coupled to the first memory 310A, the second memory 310B, the third memory 310C, and the fourth memory 310D, and can access the data stored in the first memory 310A, the second memory 310B, the third memory 310C, and the fourth memory 310D. Furthermore, the third channel control module 326 can be coupled to the first channel control module 322 and the second channel control module 324, and thus, can communicate with other channel control modules to obtain the status of data transmission. Therefore, the third channel control module 326 can perform the union task with the first channel control module 322 and the second channel control module 324.

In FIG. 5, the first channel control module 322 can send the first switch signal SIG1 to the second channel control module 324 after finishing the transmission of the first set of data D1C between the first memory 310A and the second memory 310B, so the second channel control module 324 can transmit the second set of data D2C between the first memory 310A and the third memory 310C. After finishing the transmission of the second set of data D2C, the second channel control module 324 can send the second switch signal SIG2 to the third channel control module 326. Afterwards, the third channel control module 326 can transmit the third set of data D3C between the first memory 310A and the fourth memory 310D after receiving the second switch signal SIG2. Also, after the third set of data D3C is transmitted, the third channel control module 326 can transmit the third switch signal SIG3 to the first channel control module 322, so that the first channel control module 322 can proceed to transmit the next set of data. Consequently, the data transmission system 300 can perform the union tasks with the first channel control module 322, the second channel control module 324, and the third channel control module 326 to achieve the data transmission.

In some embodiments, the data transmission system 300 can select part of the channel control modules to join the union task. For example, the data transmission system 300 may select the second channel control module 324 and the third channel control module 326 to join the union task without selecting the first channel control module 322. In order to allow the data transmission system 300 to select the desired channel control modules for performing the union tasks with better flexibility, the data transmission system 300 can include a first union task register REGU1, a second union task register REGU2, a third union task register REGU3, and a logic control circuit 330 in FIG. 5.

The logic control circuit 330 can determine if the first channel control module 322 joins the union task according to the value of the first union task register REFU1, determine if the second channel control module 324 joins the union task according to the value of the second union task register REFU2, and determine if the third channel control module 326 joins the union task according to the value of the third union task register REFU3.

In FIG. 5, the first channel control module 322 can include a first start signal terminal IT1 and a first finish signal terminal FT1, the second channel control module 324 can include a second start signal terminal IT2 and a second finish signal terminal FT2, and the third channel control module 326 can include a third start signal terminal IT3 and a third finish signal terminal FT3. In addition, the data transmission system 300 can include multiplexers MUX1, MUX2, and MUX3.

The multiplexer MUX1 has a first input terminal coupled to the second finish signal terminal FT2, a second input terminal coupled to the third finish signal terminal FT3, and an output terminal coupled to the first start signal terminal IT1. The multiplexer MUX2 has a first input terminal coupled to the first finish signal terminal FT1, a second input terminal coupled to the third finish signal terminal FT3, and an output terminal coupled to the second start signal terminal IT2. The multiplexer MUX3 has a first input terminal coupled to the first finish signal terminal FT1, a second input terminal coupled to the second finish signal terminal FT2, and an output terminal coupled to the third start signal terminal IT3.

In this case, the logic control circuit 330 can control the multiplexers MUX1, MUX2, and MUX3 according to the values of the first union task register REGU1, the second union task register REGU2, and the third union task register REGU3. For example, when the values of the first union task register REGU1, the second union task register REGU2, and the third union task register REGU3 are 1, it may imply that the first channel control module 322, the second channel control module 324, and the third channel control module 326 will join the union task. In this case, the multiplexer MUX2 will couple the first finish signal terminal FT1 to the second start signal terminal IT2, the multiplexer MUX3 will couple the second finish signal terminal FT2 to the third start signal terminal IT3, and the multiplexer MUX1 will couple the third finish signal terminal FT3 to the first start signal terminal IT1. Consequently, the switch signal SIG1 generated by the first channel control module 322 will be lead to the second channel control module 324, the switch signal SIG2 generated by the second channel control module 324 will be lead to the third channel control module 326, and the switch signal SIG3 generated by the third channel control module 326 will be lead to the first channel control module 322. Therefore, the first channel control module 322, the second channel control module 324, and the third channel control module 326 can sequentially perform the data transmission to implement the union task.

Figure 6:
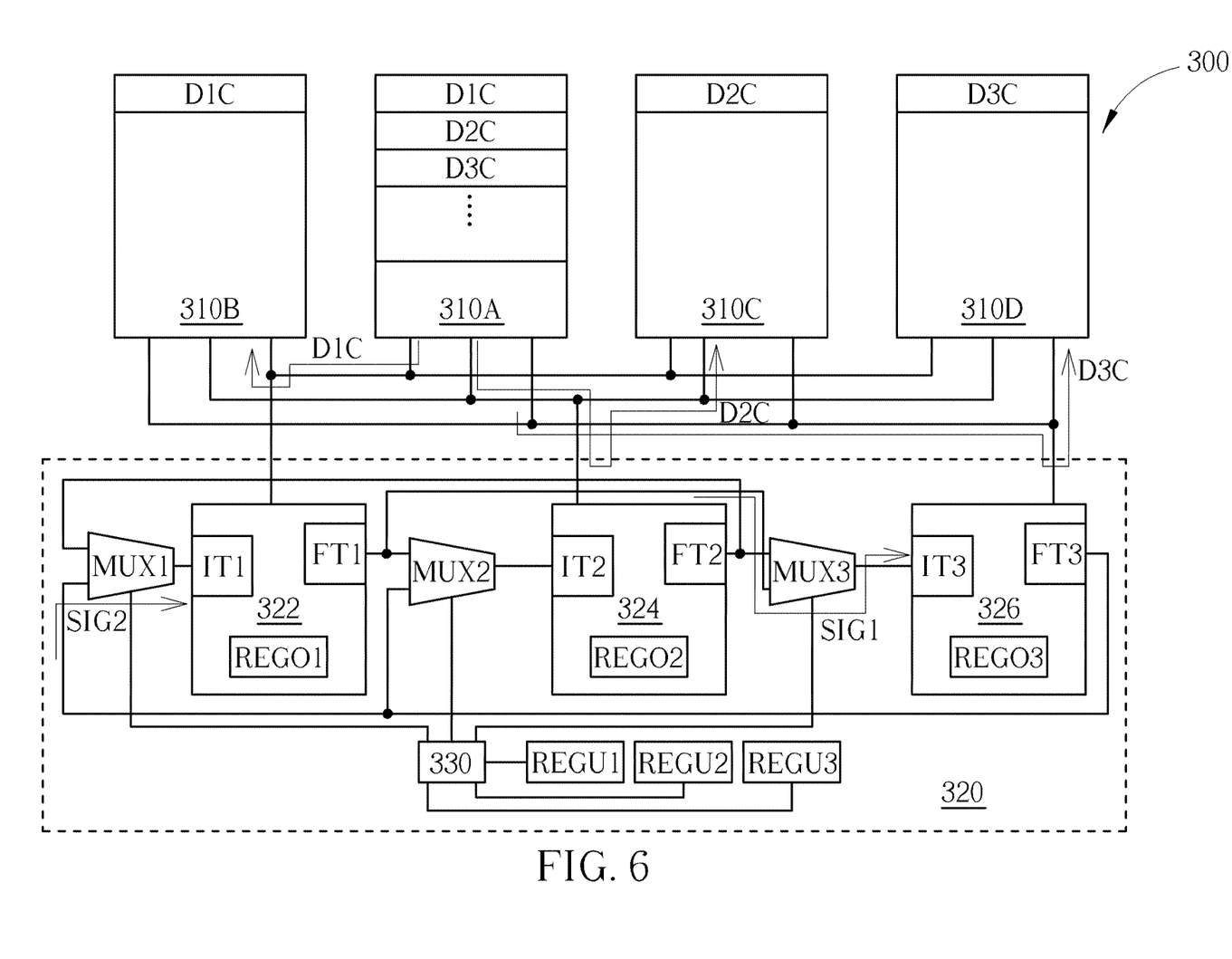
FIG. 6 shows another usage scenario of the data transmission system in FIG. 5.

FIG. 6 shows another usage scenario of the data transmission system 300. In FIG. 6, the values of the first union task register REGU1 and the third union task register REGU3 are 1 while the value of the second union task register REGU2 is 0. In this case, the multiplexer MUX3 can couple the first finish signal terminal FT1 and the third start signal terminal IT3, and the multiplexer MUX1 can couple the third finish signal terminal FT3 and the first start signal terminal IT1. Consequently, the first switch signal SIG1 generated by the first channel control module 322 will be sent to the third channel control module 326, and the second channel control module 324 will ignore the first switch signal SIG1. Later, after the third channel control module 326 finishes transmitting the data, the third channel control module 326 will transmit the second switch signal SIG2 to the first channel control module 322. Therefore, the first channel control module 322 and the third channel control module 326 can sequentially perform the data transmission to implement the union task while the second channel control module 324 not joining the union task.

In addition, in some embodiments, the data transmission system 300 may have the first channel control module 322, the second channel control module 324, and the third channel control module 326 perform the data transmission with a fixed transmission order to achieve the union task. However, in some embodiments, the data transmission system 300 can set the transmission order of the first channel control module 322, the second channel control module 324, and the third channel control module 326 flexibly. For example, the second channel control module 324 can transmit the data first, and then, the third channel control module 326 will transmit the data. Also, the first channel control module 322 will transmit the data after the third channel control module 326.

In FIGS. 5 and 6, the data transmission system 300 can further include a first transmission order register REGO1, a second transmission order register REGO2, and a third transmission order register REGO3. In this case, the first channel control module 322 can determine if the first channel control module 322 has a transmission priority according to a value of the first transmission order register REGO1, the second channel control module 324 can determine if the second channel control module 324 has the transmission priority according to a value of the second transmission order register REGO2, and the third channel control module 326 can determine if the third channel control module 326 has the transmission priority according to a value of the third transmission order register 326. In some embodiments, in the beginning of the union task, the channel control modules 322, 324, and 326 can determine if they have the transmission priority according to the values of the first transmission order register REGO1, the second transmission order register REGO2, and the third transmission order register REGO3. The channel control module having the transmission priority will start to transmit the data, and the channel control module that does not have the transmission priority will have to wait for the switch signal transmitted from the previous channel control module before it can start the data transmission. That is, by setting the corresponding values to the first transmission order register REGO1, the second transmission order register REGO2, and the third transmission order register REGO3, the data transmission system 300 is able to determine the transmission order of the first channel control module 322, the second channel control module 324, and the third channel control module 326.

Consequently, the data transmission system 300 can use the channel control modules 322, 324, and 326 to perform the scatter transmissions, the gather transmissions, and the data transmission for multiple blocks among different memories to achieve the union task. Furthermore, the data transmission system 300 can also select desired the channel control module to join the union task by setting the corresponding values of the union task registers REGU1, REGU2, and REGU3, and can determine the transmission order of the first channel control module 322, the second channel control module 324, and the third channel control module 326 by setting the corresponding values to the transmission order registers REGO1, REGO2, and REGO3. Therefore, the data transmission can be more flexible. Also, in some embodiments, the data transmission system 300 can further include more channel control modules to join the union task.

In summary, the data transmission system provided by the embodiments of the present invention can include a plurality of channel control modules for performing union tasks, thereby simplifying the data transmission among different memories and improving the efficiency of data transmission. In addition, since the channel control modules of the data transmission system can be operated independently, the channel control modules joining the union task can perform the data transmission for multiple blocks according to different schemes, such as the link list, the auto-reload scheme or the contiguous address scheme, thereby increasing the flexibility of the system. Also, the number of storage nodes in the link list can be reduced, the storage space required by the data transmission system can be reduced, and the efficiency of data transmission can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data transmission system comprising:
   a first memory;
   a second memory;
   a third memory; and
   a memory controller comprising:
      a first channel control module coupled to the first memory and the second memory, and configured to transmit a first set of data between the first memory and the second memory, and transmit a first switch signal after the first set of data is transmitted; and
      a second channel control module coupled to the first channel control module, the first memory, and the third memory, and configured to transmit a second set of data between the first memory and the third memory after the second channel control module receives the first switch signal from the first channel control module.

2. The data transmission system of claim 1, wherein:
   the second channel control module is further configured to transmit a second switch signal to the first channel control module after the second set of data is transmitted; and
   the first channel control module is further configured to transmit a third set of data between the first memory and the second memory after receiving the second switch signal.

3. The data transmission system of claim 2, wherein:
   the first channel control module transmits the first set of data from the first memory to the second memory; and
   the second channel control module transmits the second set of data from the first memory to the third memory after receiving the first switch signal.

4. The data transmission system of claim 2, wherein:
   the first channel control module transmits the first set of data from the second memory to the first memory; and
   the second channel control module transmits the second set of data from the third memory to the first memory after receiving the first switch signal.

5. The data transmission system of claim 2, wherein:
   the first set of data is corresponding to a full block of data;
   the third set of data is corresponding to a full block of data; and the first channel control module is further configured to determine if the first set of data has been transmitted according to a block transmission signal.

6. The data transmission system of claim 5, further comprising a link list comprising a plurality of storage nodes, wherein the first channel control module is further configured to:
obtain a transmission address corresponding to the first set of data from a first storage node of the link list;
obtain a second storage node of the liking list from the first storage node; and
obtain a transmission address corresponding to the third set of data from the second storage node.

7. The data transmission system of claim 5, wherein:
the first set of data and the third set of data are corresponding to a same address in the second memory; or
the third set of data is corresponding to an address in the second memory next to an address of the first set of data.

8. The data transmission system of claim 2, wherein:
the first set of data and the third set of data are corresponding to a same memory block; and
the first channel control module is further configured to determine if the first set of data has been transmitted after finishing a hardware handshake with at least one of the first memory and the second memory.

9. The data transmission system of claim 8, wherein:
the first channel control module transmits the first set of data and the third set of data according to a scatter instruction or a gather instruction.

10. The data transmission system of claim 2, wherein:
the first channel control module comprises a first start flag register and a first finish flag register;
the second channel control module comprises a second start flag register and a second finish flag register;
the first finish flag register and second start flag register are coupled to each other and are synchronized; and
the second finish flag register and first start flag register are coupled to each other and are synchronized.

11. The data transmission system of claim 10, wherein:
the first channel control module is further configured to update a value of the first finish flag register after the first set of data is transmitted; and
the second channel control module is further configured to update a value of the second finish flag register after the second set of data is transmitted.

12. The data transmission system of claim 2, wherein:
the first channel control module comprises a first start signal terminal and a first finish signal terminal;
the second channel control module comprises a second start signal terminal and a second finish signal terminal;
the first finish signal terminal and the second start signal terminal are coupled to each other; and
the second finish signal terminal and the first start signal terminal are coupled to each other.

13. The data transmission system of claim 12, wherein:
the first channel control module is further configured to output the first switch signal through the first finish signal terminal after the first set of data is transmitted; and
the second channel control module is further configured to output the second switch signal through the second finish signal terminal after the second set of data is transmitted.

14. The data transmission system of claim 13, wherein:
after the first set of data is transmitted, the first channel control module is further configured to transmit a first acknowledge signal to the second channel control module to make the second channel control module change a voltage of the first start signal terminal; and
after the second set of data is transmitted, the second channel control module is further configured to transmit a second acknowledge signal to the first channel control module to make the first channel control module change a voltage of the second start signal terminal.

15. The data transmission system of claim 13, wherein:
the first switch signal and the second switch signal are pulse signals.

16. The data transmission system of claim 1, further comprising:
a fourth memory; and
a third channel control module coupled to the second channel control module, the first memory and the fourth memory;
wherein:
the second channel control module is further configured to transmit a second switch signal to the third channel control module after the second set of data is transmitted; and
the third channel control module is configured to transmit a third set of data between the first memory and the fourth memory after receiving the second switch signal.

17. The data transmission system of claim 16, further comprising:
a first union task register;
a second union task register;
a third union task register; and
a logic control circuit configured to determine if the first channel control module joins a union task according to a value of the first union task register, determine if the second channel control module joins the union task according to a value of the second union task register, and determine if the third channel control module joins the union task according to a value of the third union task register.

18. The data transmission system of claim 16, further comprising:
a first transmission order register;
a second transmission order register;
a third transmission order register; and
wherein the first channel control module determines if the first channel control module has a transmission priority according to a value of the first transmission order register, the second channel control module determines if the second channel control module has the transmission priority according to a value of the second transmission order register, and the third channel control module determines if the third channel control module has the transmission priority according to a value of the third transmission order register.

19. The data transmission system of claim 1, wherein:
the second set of data is stored in an address in the first memory next to an address where the first set of data is stored.

20. The data transmission system of claim 1, wherein:
the first set of data and the second set of data have different data lengths.

* * * * *